United States Patent [19]

Korbanka et al.

[11] 4,378,998
[45] Apr. 5, 1983

[54] PROCESS FOR THE PREPARATION OF OXIDATION PRODUCTS OF ETHYLENE COPOLYMERS, AND THEIR USE

[75] Inventors: Helmut Korbanka, Adelsried; Karl-Heinz Stetter, Gersthofen; Günther Illmann, Stadtbergen; Rolf Jacob; Otto Malitschek, both of Gersthofen; Josef Strehle, Augsburg, all of Fed. Rep. of Germany

[73] Assignee: Hoechst Aktiengesellschaft, Fed. Rep. of Germany

[21] Appl. No.: 202,010

[22] Filed: Oct. 29, 1980

[30] Foreign Application Priority Data

Nov. 2, 1979 [DE] Fed. Rep. of Germany ....... 2944375
Dec. 15, 1979 [DE] Fed. Rep. of Germany ....... 2950602

[51] Int. Cl.$^3$ .............................................. C08F 8/06
[52] U.S. Cl. ................................... 106/270; 106/271; 525/388; 525/330.3
[58] Field of Search .................... 525/388; 106/270

[56] References Cited

U.S. PATENT DOCUMENTS

| 3,410,816 | 11/1968 | Mirabile et al. | 525/388 |
| 3,692,877 | 9/1972 | Shibahara et al. | 525/388 |
| 3,756,999 | 9/1973 | Stetter et al. | 525/388 |
| 4,039,560 | 8/1977 | Tomoshige | 525/388 |
| 4,156,062 | 5/1979 | Pritchett | 525/388 |

FOREIGN PATENT DOCUMENTS

| 1180131 | 10/1964 | Fed. Rep. of Germany | 525/388 |
| 2035706 | 1/1975 | Fed. Rep. of Germany | . |
| 125131 | 9/1975 | German Democratic Rep. | . |
| 116625 | 12/1975 | German Democratic Rep. | . |
| 128507 | 11/1976 | German Democratic Rep. | . |
| 128875 | 12/1976 | German Democratic Rep. | . |
| 968960 | 9/1964 | United Kingdom | 525/388 |
| 410043 | 1/1974 | U.S.S.R. | 525/388 |

*Primary Examiner*—Paul R. Michl
*Attorney, Agent, or Firm*—Connolly and Hutz

[57] ABSTRACT

Low-melting, easily processable and at the same time hard polar waxes are obtained by treating copolymers, which are composed of ethylene and 0.5 to 50% by weight of a monomer containing oxygen-containing groups and have melt indices (MFI 190/2) of between 0.01 and 400 g/10 minutes, in the molten state, dispersed in a dispersing agent which is inert towards oxygen, with oxygen or oxygen-containing gases. Preferably, ethylene/vinyl acetate copolymers are oxidized, and these oxidation products are particularly suitable as the wax component in water-based and/or organic solvent-based polishes and in pastes.

4 Claims, No Drawings

PROCESS FOR THE PREPARATION OF OXIDATION PRODUCTS OF ETHYLENE COPOLYMERS, AND THEIR USE

Numerous processes are known for the preparation of polar waxes by the oxidation of polyolefins with oxygen or oxygen-containing gases. In these processes, the oxidation is generally carried out in such a way that the polymer is treated in the solid or molten state with oxygen-containing gases. The processes have the disadvantage that they lead either to waxes which are hard but are high-melting and thus difficult to process, or to waxes which are low-melting and easily processable but are soft. The hard high-melting waxes with melting points above 105°, generally above 110° C., can only be emulsified, for example, with considerable technical effort, under excess pressure, at temperatures above 100° C. In contrast, because of their low hardness, the low-melting, easily processble waxes produce, for example on further processing to give emulsions, preparations which give tacky films with a high dirt uptake and unsatisfactory mechaical resistance.

Hard polar waxes are obtained by the oxidation of extensively unbranched polyolefins; they are always high-melting. Polar waxes with low melting points are formed on the oxidation of more highly branched polyolefins. They always possess only a low hardness.

In German Patent Specification No. 2,035,706, for example, a process is described in which polyethylenes or copolymers of ethylene with $C_3$- to $C_8$-$\alpha$-olefins are oxidized in the molten state, in aqueous dispersion, with oxygen-containing gases. In fact, very hard waxes, inter alia, can also be obtained by this process, but they have melting points which are generally significantly above 110° C., and they can thus only be processed with great difficulty.

A process for the oxidation of polyethylene or ethylene copolymers with oxygen or oxygen-containing gases is known from East German Patent Specification No. 116,625, in which process a liquid additive with a high heat of vaporization, which is inert towards the reactants, is continuously metered into the polymerization melt, during the oxidation, and is carried away again with the reaction gases. Suitable ethylene polymers are polyethylene waxes with molecular weights $\leq 15,000$ and also ethylene/vinyl acetate copolymers with vinylacetate contents of 1 to 45% by weight. In fact, low-melting, but very soft and tacky oxidation products, with penetration indices which are generally above 20, are obtained by this process, and this applies to a particularly pronounced extent to the oxidation products of the ethylene/vinyl acetate copolymers which, as is known, are highly branched.

To improve the unsatisfactory properties of the known oxidation products, it has already been proposed to subject polyethylene waxes with molecular weights $< 15,000$, mixed with high-molecular homopolymers or copolymers with molecular weights $> 15,000$, to oxidation in the melt (East German Patent Specification No. 125,131). The oxidation products obtained in this process are non-homogeneous and are again also either high-melting with melting points above 110° C. or soft with penetration indices above 10. Furthermore, long reaction times are required and this necessitates considerable effort and leads to thermal degradation of the products. Thus, East German Patent Specification No. 128,507 recommends the oxidation of ethylene/vinyl acetate copolymers, inter alia, in the melt, with the addition of special metal catalysts. Even in this case, only high-melting or soft waxes are obtained, which also exhibit colorations as a result of the metal catalysts present therein.

Finally, in an effort to obtain polar waxes of better quality, attempts have been made initially to thermally degrade high-molecular olefin homopolymers or copolymers with the exclusion of oxygen and then to oxidize them in the melt with oxygen-containing gases (East German Patent Specification No. 128,875). However, even in this way, it is not possible to prepare waxes which are low-melting, easily processable and at the same time hard. Furthermore, this process is uneconomic as a result of the two process steps required.

The object of the present invention was therefore to make available waxes which are low-melting and therefore easily processable, but are at the same time very hard.

Surprisingly, it has been found that this is possible if special ethylene copolymers are oxidized in the molten state, dispersed in a dispersing agent or medium, with oxygen or oxygen-containing gases.

Accordingly, the invention relates to a process for the preparation of polar waxes which are low-melting, easily processable and at the same time hard, by the oxidation of ethylene copolymers with oxygen or oxygen-containing gases, a melt of the polymer, dispersed in a dispersing agent which is inert towards oxygen, being treated with oxygen or oxygen-containing gases at temperatures between the melting point of the polymer and 100° C. above the latter, at an excess pressure between 0 and 100 bars and, if appropriate, in the presence of wetting agents and/or catalysts, with continuous intensive mixing, which process comprises using those copolymers, with melt indices between 0.01 and 400 g/10 minutes, in which, in addition to ethylene, 0.5 to 50% by weight of other monomers which are olefinic but contain oxygen-containing groups are copolymerized.

It was not to be expected that polar waxes which are low-melting, easily processable and at the same time very hard can be obtained by the process according to the invention, because it had to be assumed from previous experience that it would only be possible to prepare either waxes which are low-melting and in fact easily processable but are soft, or waxes which are high-melting, difficult to process and then also hard. Above all, however, it must be regarded as surprising that waxes with such a high hardness and other advantageous properties could be obtained from polymers with a high degree of branching, because, from previous experience, particularly soft waxes were to be expected precisely when using branched polymers.

Finally, it could not be predicted that, in the process according to the invention, if the reaction is carried out with water as the dispersing agent, in accordance with the preferred procedure, no noticeable hydrolysis of the ester groups of the polymers used occurs, even in the presence of very large amounts of water, that is to say oxidation products with a high content of esters of value in application technology are formed, which have numerous improved properties compared with known oxidation products.

The process starts from raw materials which are available at low cost. The reaction also proceeds, without the use of catalysts which degrade the products, in a mild and exceptionally rapid manner in a single process step. Light-colored, odorless and homogeneous oxidation products without crosslinked portions are formed. The oxidation products have low dropping points but at the same time have high hardnesses and numerous other advantageous properties. In particular, they can be further processed with reduced effort and thereby yield products with improved, novel use properties.

In terms of the invention, ethylene copolymers are to be understood as meaning ethylene copolymers in which, in addition to ethylene, 1 to 50% by weight of other olefinic monomers, which contain oxygen-containing groups, has been copolymerized. The copolymers are prepared in accordance with known processes. In particular, they are obtained by free-radical high-pressure polymerization, solution polymerization, suspension polymerization or emulsion polymerization. The olefinic monomers with oxygen-containing groups, which are used in addition to ethylene for the preparation of the copolymers, are, for example, vinyl esters of carboxylic acids, such as vinyl acetate or vinyl propionate, and also vinyl ethers or $\alpha,\beta$-ethylenically unsaturated carboxylic acids and derivatives thereof, such as acrylic acid, methacrylic acid, ethacrylic acid, crotonic acid, fumaric acid, maleic acid, maleic anhydride, itaconic acid and mesaconic acid, or the esters of these acids. The copolymers can also contain several monomer components of different types, with oxygen-containing groups. The proportion of the monomer with oxygen-containing groups, in the copolymer, is 0.5 to 50, preferably 1 to 30 and in particular 1 to 20% by weight. The copolymers have a melt index of between 0.01 and 400, preferably between 0.1 and 200 and in particular between 0.1 and 100 g/10 minutes, determined in accordance with DIN 53,735 at 190° C. and with a load of 2.16 kp (MFI 190/2). The molecular weights of copolymers of this type are generally above 15,000. The copolymers can be completely or partially saponified before the oxidation. Furthermore, the copolymers can be subjected to the oxidation in a mixture with one another or in a mixture with other polyolefins and/or synthetic or natural waxes or paraffins.

The oxidation process is generally carried out in such a way that the ethylene copolymer is dispersed in a dispersing agent which is inert towards oxygen, if appropriate in the presence of catalysts and/or wetting agents, and treated with the reaction gas at a temperature above the melting point of the copolymer, with constant, thorough internal mixing of the reactants. As a result of being dispersed in the dispersing agent, the polymer can be brought into very close contact with the reaction gas, so that an exceptionally rapid and at the same time mild reaction takes place.

Water is preferably used as the dispersing agent, but, in addition to this, saturated fatty acids with 2 to 8 C atoms or chlorinated hydrocarbons and the like, for example, can also be used. The dispersing agent is used in an amount by weight which is 0.5 to 20 times, preferably one to 10 times, greater than that of the copolymer. Dispersing agent which escapes with the off-gas is replaced by fresh dispersing agent if necessary. To facilitate the dispersion of the copolymer, wetting agents, for example fatty acids, fatty alcohols, ethoxylation products of alcohols or phenols, or metal soaps, metal hydroxides or metal salts, can be added to the reaction mixture.

To reduce the induction time and to accelerate the oxidation process, the reaction can be carried out in the presence of catalysts. Examples of suitable catalysts are peroxy compounds or also previously oxidized copolymer or used dispersing agent. Furthermore, ozone can be mixed with the oxidizing gas. Moreover, metal compounds can be added as oxidation catalysts. However, when adding the last-mentioned substances, there is the danger that colored and crosslinked products may be formed, but, because of the exceptionally high reaction rate, compared with known processes, the presence of catalysts of this type is not generally necessary.

The reaction temperature is above the melting point of the copolymer used and exceeds the melting point by up to 100°, preferably by up to 80° C. The most favorable reaction temperatures are between 130 and 180, preferably 140° and 170° C. Temperature control does not present any difficulties because the dispersing agent used is an ideal medium for supplying and extracting heat. Heat extraction takes place with the aid of the dispersing agent, both via the vessel walls and via the gas volume by evaporative cooling.

The oxidation can be carried out at normal pressure or under an excess pressure of up to 100 bars. The most favorable reaction pressures are between 5 and 100, in particular between 5 and 30 bars of excess pressure. The preferred oxidizing agent is air, the oxygen content of which can also be increased, if appropriate, by adding oxygen.

The oxidation can be interrupted after any desired degree of oxidation has been reached. The separation of the dispersing agent and the oxidation product does not present any difficulties. The dispersing agent separates out from the oxidation melt, for example on standing, and can then be run off or drawn off. The separation is particularly successful if the oxidation has been carried out at low temperatures, for example at 150° C. The separation can also be promoted by adding emulsion breakers, for example polymerization products of propylene oxide and/or ethylene oxide. Residual dispersing agent can then be removed by evaporation. Spray-drying of the moist product melt is also possible.

With the process according to the invention, it is possible to achieve virtually any degree of oxidation under consideration. For example, product acid numbers of up to 200 can be achieved. In the case of starting materials which do not themselves have acid numbers, in particular oxidation products with acid numbers of between 3 and 100, preferably between 3 and 50, are of practical importance. The optimum product acid numbers in an individual case depend on the type of starting material and on the intended use of the product. Because the hardness of the oxidation products decreases with increasing acid number, it is not generally attempted to obtain higher acid numbers than are required in order to achieve other properties, for example a good emulsifiability or an adequately low melt viscosity. In this context, higher acid numbers are generally necessary in the case of copolymers with a higher ethylene content than in the case of those with a lower ethylene content.

The new oxidation products have hitherto unknown combinations of properties. The products are light-colored and odorless. Their molecular weights are generally between 200 and 20,000, preferably between 400 and 8,000, and their melt viscosites are between 200 and 50,000, preferably between 500 and 10,000 mPas (120° C.). The molecular weight distribution is narrow. The oxidation products are in themselves homogeneous and do not contain any crosslinked portions. The dropping points are below 110° C., generally below 105° C. and frequently below 100° C. The products nevertheless have unusually high hardnesses. Their needle penetration is generally less than $10 \cdot 10^{-1}$ mm, usually less than $5 \cdot 10^{-1}$ mm. The hardness (pressure required to produce flow) is generally greater than 200 bars, usually greater than 400 bars. This is much more a case of a viscous hardness, with particular advantages in application technology, than of a brittle hardness. In addition to the oxygen-containing groups produced by oxidation, the products contain the oxygen-containing groups originating from the starting material. This manifests itself, for example in the case of oxidation products of ethylene/vinyl acetate copolymers, in the ester numbers, which, in contrast to those of known oxidation products of polyethylene waxes, are many times greater, for example 1 to 20 times greater, than the respective acid numbers. The combination of the oxygen-containing groups originally present and those produced by oxidation imparts, to the oxidation products, a particularly balanced polarity, which leads to improved properties in application technology. The oxidation products are distinguished, in particular, by a good emulsifiability, shining capacity, solvent-binding capacity, paste-forming capacity, ability to be polished, adhesive power and compatibility with other substances. As a result of these properties, the oxidation products can advantageously be used in numerous fields.

The products are preferably suitable for the preparation of aqueous emulsions. The emulsification can be carried out under pressure, or also—because of the low dropping points of the oxidation products—under normal pressure, with low technical effort. Finely divided, highly transparent emulsions with considerably fewer specks are formed. The emulsions dry to give films with a high instant shine, and these have an improved hardness, scratch resistance, abrasion resistance, flexibility, breaking strength and adhesion to the substrate. In particular, they are also distinguished by a reduced dirt uptake and increased slip resistance. Worn films can be regenerated by polishing. The emulsions can advantageously be used in the field of cleaning agents, for example in instant-shine emulsions. In addition, they can also be used, for example, in the field of paper coating, the coating of fruit, and rendering textiles, wood, leather, building materials and the like hydrophobic and providing the said materials with a finish.

The products are furthermore suitable for the preparation of solvent-based polishes, floor waxes and shoe polishes and also of anti-corrosion agents, coating compositions, hot melts, asphalt preparations, adhesives, color dispersions, pigment concentrates, carbon paper coatings, abrasion-resistant printing inks, lacquer-matting agents, textile finishes, pourable sealing compounds, precision-casting waxes, cosmetic preparations, candles, greases, lubricating oil additives, lubricants for metal working and auxiliaries for plastics processing, for example lubricants or parting compounds. In preparations, the products generally improve the compatibility, adhesion, sealing capacity, flowability and impermeability.

As regards the preferred possible uses of the new oxidation products as the wax component in water-based and solvent-based polishes, in aqueous and solvent-based emulsions and also in pastes, the oxidation products used for this purpose are, in particular, those which have been obtained from ethylene/vinyl acetate copolymers with a melt index of 0.1 to 200 g/10 minutes (determined in accordance with DIN 53,735 at 190° C. and with a load of 2.16 kp [MFI 190/2]) and with a vinyl acetate content of 1 to 30, preferably 5 to 20 and in particular 5 to 10% by weight, and which have acid numbers of 10 to 50, preferably 15 to 25, melt viscosities at 120° C. of 500 to 20,000 mPas, and saponification numbers of 70 to 140. Oxidation products with an acid number of 15 to 20, a saponification number of 80 to 110 and a density at 20° C. of about 0.96 g/cm$^3$ are preferred. The hardness of an oxidation product of this type is about 600 kg/cm$^2$ and the melt viscosity is about 1,500 to 5,000, in particular about 2,000 mPas.

In the polishes formulated using the new oxidation products, the amounts of wax is 0.01 to 50% by weight, relative to the finished polish, the low concentrations applying to the wipe-on waxes for use in a highly dilute form, whilst the amounts of wax in pastes and emulsion polishes are between 1 and 50% by weight. In the preparations, further constituents which are customary in polishes of these types and which depend on the formulation and the intended use can also be present, such as, for example, other waxes, paraffins, ionic and/or non-ionic emulsifiers, substances with a cleaning action, solvents, wetting agents and levelling agents, polymer dispersions, film-forming auxiliaries, temporary and permanent plasticizers, antistatic agents, bactericides, preservatives, dyestuffs, metal salts and corrosion inhibitors.

The fact that the use of the oxidation products in the field of cleaning agents and polishes would give surprising results could in no way be predicted since, because of their high hardnesses, and also as in the case of comparable polyethylene waxes, films were to be expected which are hard, dirt-repellent and mechanically resistant, but are not non-slip. It was also necessary to take account of the fact that the vinyl acetate component in the polymers has an unfavorable action on other properties of the polish films, for example their waterproofness and alkali resistance. The fact that, in the present case, the polish films have a high hardness and a very good slip resistance, without their other use properties being impaired, also had to be regarded by the expert as astonishing. With the aid of the new oxidation products, it is thus possible to meet the long-existing need for polish films with maximum slip protection and flexibility and at the same time optimum utilization of the technical progress with regard to hardness, viscosity and resistance to tread marks, in a better and simpler way than is made possible, for example, by the incorporation of anti-slip additives, which have many other disadvantages [compare German Offenlegungsschrift No. 2,707,938; Braun and Roemer, Fette-Seifen-Anstrichmittel, 76 (1974), page 169].

Finally, the new waxes can also be used in combination with other waxes, for example ester waxes, paraffin waxes, microcrystalline waxes and the like. In addition, the oxidation products can be chemically modified for special applications, for example by partial or complete esterification with monohydric or polyhydric alcohols and/or by saponification with monovalent or polyvalent metal ions, and also by amidation or by partial or complete hydrolysis or transesterification of ester groups obtained. Oxidative after-treatment of the oxidation products is also possible, for example using hydrogen peroxide or chromosulfuric acid.

The following examples serve to illustrate the invention further.

EXAMPLE 1

TABLE 1

| Sample No. | Reaction time (hours) | Acid number (mg of KOH/g) | Saponification number (mg of KOH/g) | Dropping point (°C.) | Color | Melt viscosity mPas (120° C.) | Molecular weight | Needle penetration (mm · 10⁻¹) | Hardness bars (20° C.) | Density g/cm³ (20° C.) | Vinyl acetate content (% by weight) |
|---|---|---|---|---|---|---|---|---|---|---|---|
| 1 | 1.2 | 7 | 75 | 106 | white | — | 7,500 | 1 | 800–900 | 0.944 | 8.4 |
| 2 | 1.6 | 10 | 77 | 104 | white | 26,400 | 5,800 | 2 | 700–800 | 0.948 | 8.4 |
| 3 | 2.0 | 15 | 85 | 102 | white | 7,200 | 4,300 | 2 | 650–750 | 0.953 | 8.3 |
| 4 | 2.2 | 20 | 93 | 101 | white | 2,600 | 3,360 | 2–3 | 600–700 | 0.955 | 8.2 |
| 5 | 2.3 | 24 | 97 | 100 | white | 1,640 | 2,980 | 3 | 600–650 | 0.960 | 8.3 |
| 6 | 2.4 | 28 | 102 | 99 | white | 1,180 | 2,670 | 3–4 | 550–600 | 0.966 | 8.3 |
| 7 | 2.6 | 38 | 115 | 98 | almost white | 760 | 1,850 | 4 | 400–450 | 0.974 | 8.3 |
| 8 | 2.8 | 48 | 130 | 96 | slightly yellow | 320 | 1,470 | 4–5 | 300–350 | 0.985 | 8.2 |

20 liters of distilled water, 7.6 kg of an ethylene/vinyl acetate copolymer [vinyl acetate content: 8.5% by weight, density: 0.928 g/cm³, melt index (MFI 190/2): 2.5 g/10 minutes] and, as the catalyst, 0.4 kg of an oxidation product of the ethylene/vinyl acetate copolymer, with an acid number of 18, are introduced into a 40-liter stainless steel kettle. The contents of the kettle are heated to the reaction temperature of 150° C. During heating, the passage of an airstream of 3 Nm³/hour through the mixture is started, whilst stirring vigorously and maintaining an excess pressure of 15 bars. After the reaction temperature has been reached, samples are continuously taken from the kettle by direct expansion, the samples being obtained in the form of a spray powder. To end the oxidation, the air supply and the stirrer are stopped. The water which settles out is separated from the oxidation product, and the oxidation product melt is dried by evaporating off the remaining water. The properties of the intermediate samples taken and of the resulting end product are represented in Table 1.

The resulting oxidation products are easily emulsifiable when the acid numbers are 15 or more. Finely divided, speck-free, highly transparent emulsions are formed, which dry with a high instant shine. The films which are formed are extremely resistant and non-slip.

EXAMPLES 2 TO 21

Various ethylene/vinyl acetate copolymers are oxidized as in Example 1, 2.375 kg of copolymer and 125 g of the respective oxidation product, with an acid number of 18, being used in each case. The starting materials and the results are summarized in Table 2.

The oxidation products can be processed to give outstanding emulsions when the melt viscosities are below 7,000 mPas (120° C.). Products with higher melt viscosities can be emulsified by adding waxes of lower viscosity, for example microcrystalline waxes and/or ester waxes based on natural wax.

The oxidation products are outstandingly suitable as lubricants in plastics processing. In PVC processing, they preferably act as internal lubricants and give rise to a high transparency and high extrusion rates.

TABLE 2

| Example No. | Starting material Vinyl acetate content (% by weight) | Melt index (g/10 minutes) | Density (g/cm³) | Reaction temperature (°C.) | Reaction time (hours) | Acid number mg of KOH/g | Saponification number mg of KOH/g | Dropping point (°C.) | Melt viscosity mPas (120° C.) | Needle penetration (mm · 10⁻¹) | Hardness (bars) | Density (g/cm³) | Vinyl acetate content (% by weight) |
|---|---|---|---|---|---|---|---|---|---|---|---|---|---|
| 2 | 8 | 0.3 | 0.928 | 165 | 1.2 | 21 | 87 | 99 | 3,500 | 2–3 | 600–650 | 0.960 | — |
| 3 | 9 | 9 | 0.926 | 165 | 0.5 | 14 | 69 | — | 15,800 | 1 | 860 | 0.954 | — |
| 4 | 9 | 9 | 0.926 | 165 | 0.6 | 19 | 84 | 99 | 6,800 | 2–3 | 640 | 0.957 | — |
| 5 | 9 | 9 | 0.926 | 165 | 0.8 | 25 | 95 | 98 | 2,500 | 3–4 | 500 | 0.965 | — |
| 6 | 9 | 9 | 0.926 | 165 | 1.2 | 38 | 114 | 95 | 750 | 4 | 360 | 0.977 | — |
| 7 | 2.5 | 1.4 | 0.924 | 165 | 1.3 | 24 | 56 | 106 | 6,100 | 3–4 | 520–570 | 0.962 | — |
| 8 | 3 | 0.7 | 0.927 | 165 | 1.5 | 27 | 67 | 108 | 8,500 | 3–4 | 500–560 | 0.969 | — |
| 9 | 3 | 0.7 | 0.927 | 150 | 1.8 | 38 | 73 | 105 | 1,200 | 4 | 400–450 | 0.977 | — |
| 10 | 4.5 | 15 | 0.924 | 165 | 0.5 | 21 | 79 | 101 | 4,800 | 4 | 450–500 | 0.954 | — |
| 11 | 4.5 | 120 | 0.923 | 165 | 0.6 | 21 | 79 | 99 | 2,950 | 4 | 400–450 | 0.949 | — |
| 12 | 4.5 | 120 | 0.923 | 165 | 0.8 | 30 | 87 | 96 | 1,100 | 4–5 | 300–350 | 0.957 | — |
| 13 | 10 | 170 | 0.926 | 165 | 0.5 | 14 | 98 | 93 | 3,700 | 4 | 420–470 | 0.952 | — |
| 14 | 10 | 170 | 0.926 | 165 | 0.6 | 19 | 115 | 92 | 2,640 | 5 | 260–290 | 0.954 | — |
| 15 | 13 | 3 | 0.934 | 150 | 1.6 | 15 | 113 | 98 | 2,800 | 2 | 800–850 | 0.960 | 12.8 |
| 16 | 13 | 3 | 0.935 | 150 | 2.1 | 25 | 129 | 97 | 1,100 | 4 | 400–450 | 0.975 | 12.5 |
| 17 | 20 | 3 | 0.940 | 150 | 1.6 | 14 | 168 | 93 | 3,100 | 2–3 | 700 | 0.966 | 19.6 |
| 18 | 20 | 3 | 0.940 | 150 | 1.9 | 22 | 175 | 88 | 1,680 | 4 | 400 | 0.979 | 19.0 |
| 19 | 20 | 10 | 0.940 | 150 | 1.5 | 15 | 154 | 92 | 2,500 | 3–4 | 500 | 0.968 | 19.5 |
| 20 | 28 | 25 | 0.950 | 150 | 1.2 | 10 | 205 | 92 | 6,600 | 4 | 400–450 | 0.967 | 27.5 |
| 21 | 28 | 25 | 0.950 | 150 | 1.6 | 15 | 218 | 86 | 3,390 | 6 | 200–250 | 0.977 | 27.4 |

COMPARISON EXAMPLE (a)

A low-molecular ethylene/vinyl acetate copolymer with a vinyl acetate content of 8% by weight, a melt viscosity of 920 mPas (120° C.), a molecular weight of 4,580 and a density of 0.930 g/cm³ is oxidized, according to East German Patent Specification No. 116,625, Example 21, in the melt, with the continuous addition of 15 ml of water/hour/kg of copolymer. A catalyst is not used. A soft greasy oxidation product with an acid number of 17 is obtained, which has a saponification number of 103, a dropping point of 87° C. and a needle penetration of $21 \cdot 10^{-1}$ mm. Because of the lack of hardness, the product is unsuitable, for example, for the preparation of usable cleaning agent emulsions.

COMPARISON EXAMPLE (b)

A high-molecular ethylene/vinyl acetate copolymer with a vinyl acetate content of 10% by weight, a melt index of 370 g/10 minutes and a density of 0.926 g/cm$^3$ is oxidized according to East German Patent Specification No. 116,625, Example 25. The reaction is also carried out in the melt and 27 ml of water/hour/kg of copolymer are added continuously. The manganese/tin salt of a fatty acid is present as the catalyst. After a reaction time of 8 hours, no noticeable increase in the acid number can be determined. The product then crosslinks to give an infusible, colored, unusable mass.

EXAMPLES 22 TO 26

A mixture of equal parts of an ethylene/vinyl acetate copolymer (vinyl acetate content: 8% by weight, melt index: 2.5 g/10 minutes, density: 0.928 g/cm$^3$) and of an ethylene homopolymer (melt index: 18 g/10 minutes, density: 0.918 g/cm$^3$) is oxidized as described in Example 2. The results obtained are summarized in Table 3.

The products can be processed to give emulsions which dry to give hard, abrasion-resistant films with a high shine. The films contained fewer specks and had a higher slip resistance than films of known oxidatin products.

are esterified by stirring it in the melt, at a temperature of 125° C., with 11.7 g of n-propanol, with the addition of catalytic amounts of sulfuric acid. A light-colored ester wax with an acid number of 14, a saponification number of 117 and a dropping point of 91° C. is obtained. The wax is outstandingly suitable for the preparation of emulsions and pastes or as a lubricant for plastics processing.

EXAMPLE 32

50 g of sample 6 with an acid number of 28, obtained in Example 1, are saponified by stirring it in the molten state, at a temperature of 130° C., with 1 g of calcium hydroxide. A light-colored wax soap with an acid number of 6, a saponification number of 74 and a dropping point of 104° C. is formed, which can be used predominantly as an internal lubricant in PVC processing.

EXAMPLES 33 TO 35

These examples show the advantages gained by using the new oxidation products as the wax component in polishes.

EXAMPLE 33

Solvent-based paste (floor wax, shoe polish)

4.0 parts by weight of an oxidized ethylene/vinyl acetate copolymer with an acid number of 18 and a saponification number of 85 (obtained from a copolymer with a vinyl acetate content of about 8%), 4.0 parts by weight of a plastic microcrystalline wax and 12.0 parts by weight of cake paraffin with a melting point of 60° to 62° C. were dissolved, at about 70° C., in 80.0 parts by weight of white spirit.

TABLE 3

| Example No. | Reaction time (hours) | Acid number (mg of KOH/g) | Saponification number (mg of KOH/g) | Dropping point (°C.) | Melt viscosity mPas (120° C.) | Needle penetration (mm · 10$^{-1}$) | Hardness (bars) | Density (g/cm$^3$) | Color |
|---|---|---|---|---|---|---|---|---|---|
| 22 | 0.7 | 16 | 49 | 105 | 4,870 | 3–4 | 470–530 | 0.952 | white |
| 23 | 0.75 | 18 | 58 | 104 | 3,090 | 3–4 | 490–520 | 0.956 | white |
| 24 | 0.8 | 21 | 60 | 103 | 2,120 | 4 | 430–450 | 0.960 | white |
| 25 | 0.86 | 25 | 64 | 103 | 1,600 | 3 | 560–590 | 0.965 | white |
| 26 | 1 | 29 | 76 | 103 | 1,290 | 3 | 530–560 | 0.968 | white |

EXAMPLES 27 TO 30

In each case, 1 kg of various copolymers of ethylene and acrylic acid or acrylates is oxidized at 165° C., as indicated in Example 1, but without the addition of a previously prepared oxidation product. The starting materials and the results are shown in Table 4.

After cooling, whilst stirring, 100.0 parts by weight of a pasty solvent-based product were obtained (paste A).

For comparison purposes, pastes were prepared from an unoxidized polyethylene wax with a molecular weight of about 3,000 and a hardness of about 600 kg/cm$^2$ (paste B), from an unoxidized polyethylene wax

TABLE 4

| | Starting material | | | | | | | | | | |
|---|---|---|---|---|---|---|---|---|---|---|---|
| Example No. | Acrylic acid content (% by weight) | Melt index (g/10 minutes) | Density (g/cm$^3$) | Reaction time (hours) | Acid number mg of KOH/g | Saponification number mg of KOH/g | Dropping point (°C.) | Melt viscosity mPas (120° C.) | Needle penetration mm · 10$^{-1}$ | Hardness (bars) | Density (g/cm$^3$) |
| 27 | 3.5 | 11 | 0.925 | 0.75 | 60 | 81 | 101 | 400 | 3 | 450–500 | 0.971 |
| 28 | 8 | 5.5 | 0.932 | 1 | 72 | 86 | 103 | 5,820 | 4–5 | 350–400 | 0.963 |
| 29 | 12+ | 7 | 0.937 | 0.75 | 58 | 76 | 100 | 730 | 4 | 400–450 | 0.969 |
| 30 | 20 | 200 | 0.949 | 0.5 | 162 | 179 | 86 | 6,080 | 5 | 250 | 0.988 |

+half of which is present as tert.-butyl acrylate

EXAMPLE 31

300 g of the oxidation product with an acid number of 48 (sample 8), obtained in accordance with Example 1, with a molecular weight of about 1,500 and a hardness of about 300 kg/cm$^2$ (paste C) and from an oxidized polyethylene wax with an acid number of 18, a molecular weight of about 1,700 and a hardness of about 250 kg/cm² (paste D).

The properties of the pastes in application technology are shown in Table 5.

TABLE 5

| Property | Paste according to Example | | | |
|---|---|---|---|---|
| | 33 A | 33 B | 33 C | 33 D |
| Paste hardness (g/cm²) | 650 | 580 | 260 | 610 |
| Traffic properties on linoleum | | | | |
| Dirt uptake | low | low | high | low |
| Slip resistance (subjective) | very good | poor | good | moderate |
| Adhesive friction coefficient+ | | | | |
| with metal shoes | 0.56 | 0.42 | 0.54 | 0.50 |
| with leather shoes | 0.63 | 0.48 | 0.59 | 0.57 |

+Determination of the adhesive friction coefficient in accordance with the method described in the journal "Fette, Seifen, Anstrlchmittel", 76 (1974), pages 163–169, in the article by R. Braun and B. Roemer entitled "Einfluss von Wachsen auf Haft- und Gleitreibung" ("Influence of Waxes on Adhesive Friction and Sliding Friction").

EXAMPLE 34

Instant-shine emulsion (to be applied undiluted)

A wax emulsion containing 18% of solids was initially prepared by saponifying a hot melt, at 130° C., of

| | |
|---|---|
| 15.0 parts by weight | of the wax mentioned in Example 33, in the presence of |
| 3.0 parts by weight | of isotridecyl polyglycol ether (containing 8 moles of ethylene oxide), with |
| 0.5 part by weight | of 43% strength KOH solution, stirring the melt into |
| 81.5 parts by weight | of boiling water and then cooling the mixture rapidly to room temperature. |
| 100.0 parts by weight | of wax emulsion (emulsion A) were formed. |

For comparison, emulsions were prepared from an oxidized polyethylene wax with an acid number of 27, a molecular weight of about 5,000 and a hardness of about 800 kg/cm² (emulsion B) and from an oxidized polyethylene wax with an acid number of 18, a molecular weight of about 1,500 and a hardness of about 250 kg/cm² (emulsion C).

In each case, 30 parts by weight of the resulting wax emulsion were formulated, at room temperature, to give ready-for-use instant-shine emulsions by simply stirring the wax emulsion together with the following components in the amount and order indicated.

| | |
|---|---|
| 30.0 parts by weight | of wax emulsion A, B or C, containing 18% of solids, |
| 5.0 parts by weight | of a 15% strength alkaline solution of crosslinked resin (colophony/maleate resin), |
| 70.0 parts by weight | of a 15% strength acrylate copolymer dispersion with a film-forming temperature of about 55° C., |
| 2.2 parts by weight | of ethyldiglycol, |
| 0.7 part by weight | of tributoxyethyl phosphate, |
| 0.7 part by weight | of dibutyl phthalate, |
| 1.0 part by weight | of a 1% strength aqueous solution of a fluorinated surfactant |
| 109.6 parts by weight | of instant-shine emulsion. |

The emulsions were applied undiluted to PVC in an amount of 20 ml/m².

TABLE 6

| Property of the wax film | Polish emulsion in accordance with Example | | |
|---|---|---|---|
| | 34 A | 34 B | 34 C |
| Dirt uptake | low | very low | high |
| Slip resistance (subjective) | very good | poor | good |
| Adhesive friction coefficient | | | |
| with metal shoes | 0.62 | 0.49 | 0.52 |
| with leather shoes | 0.76 | 0.68 | 0.71 |

EXAMPLE 35

Wipe-on wax (to be applied diluted in a ratio of up to 1:100 with water)

The wax emulsions prepared first in accordance with Example 34 were formulated, at room temperature, to give wipe-on wax concentrates by simply stirring the wax emulsions together with the following components in the amount and order indicated.

| | |
|---|---|
| 50.0 parts by weight | of wax emulsion A, B or C, containing 18% of solids, |
| 39.0 parts by weight | of water, |
| 2.0 parts by weight | of sodium tetraborate decahydrate (borax), |
| 9.0 parts by weight | of nonylphenol polyglycol ether containing 10 moles of ethylene oxide |
| 100.0 parts by weight | of wipe-on wax concentrate. |

To estimate the slip protection on PVC, the concentrates were diluted in a ratio of 1:100 with water, and 20 ml of the dilution were spread per m² of PVC floor.

From this, it is calculated that 14 mg of wax are used per m² of surface or that the layer thickness of the wax film is 0.000014 mm. Notwithstanding the low amounts used, the following differences were found in the film properties claimed:

TABLE 7

| Property of the wipe-on wax film | Wipe-on wax from the wax emulsion in accordance with Example | | |
|---|---|---|---|
| | 34 A | 34 B | 34 C |
| Slip resistance (subjective) | good | poor | moderate |
| Adhesive friction coefficient | | | |
| with metal shoes | 0.38 | 0.32 | 0.36 |
| with leather shoes | 0.58 | 0.52 | 0.55 |

We claim:
1. A hard, easily processable polar wax with a dropping point above 80° C. and below 110° C., a needle penetration index below 10·10⁻¹ mm and an acid number of up to 200, obtained by oxidation of an ethylene/vinylacetate copolymer having a melt index between 0.01 and 400 g/10 minutes and a vinylacetate content of from about 1 to about 30% by weight, with oxygen or oxygen-containing gases, in the molten state and dispersed in a dispersing agent being inert towards oxygen, at a temperature between the melting point of the copolymer and 100° C. above the melting point, an excess pressure between 0 and 100 bars and with continuous intensive mixing.

2. A wax as claimed in claim 1, wherein the ethylene/vinylacetate copolymer has a vinyl acetate content of 2.5 to 28% by weight and a melt index of 0.1 to 200 g/10 minutes.

3. A wax as claimed in claim 1, wherein the dispersing agent comprises water.

4. A wax-containing polish in the form of water-based and/or organic solvent-based dispersion or in the form of a paste, which polish has wax content of 0.01 to 50% by weight and contains the other constituents customary in polishes of these types, and which, after drying, results in durable and particularly non-slip films, wherein the wax component is a hard, easily processable polar wax according to claim 10 having an acid number of from 10 to 50 and a melt viscosity at 120° C. of from 500 to 20,000 mPas, which has been obtained from an ethylene/vinylacetate copolymer with a vinyl acetate content of 1 to 30% by weight and a melt index of from 0.1 to 200 g/10 minutes, determined in accordance with DIN 53,735 at 190° C. with a load of 2.16 kp (MFI 190/2).

* * * * *